(12) United States Patent
Lee et al.

(10) Patent No.: US 9,861,253 B2
(45) Date of Patent: Jan. 9, 2018

(54) WATER SOFTENING APPARATUS, DISHWASHER HAVING THE SAME AND CONTROL METHOD THEREOF

(71) Applicant: SAMSUNG ELECTRONICS CO., LTD., Suwon-si, Gyeonggi-do (KR)

(72) Inventors: Sang Hoon Lee, Yeoju-si (KR); Jeong Myeong Kim, Seoul (KR); Seung Ah Joo, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 25 days.

(21) Appl. No.: 14/451,055

(22) Filed: Aug. 4, 2014

(65) Prior Publication Data
US 2015/0068565 A1 Mar. 12, 2015

(30) Foreign Application Priority Data
Sep. 10, 2013 (KR) ........................ 10-2013-0108593

(51) Int. Cl.
*A47L 15/42* (2006.01)
*C02F 1/42* (2006.01)
*C02F 5/00* (2006.01)

(52) U.S. Cl.
CPC ....... *A47L 15/4231* (2013.01); *A47L 15/4217* (2013.01); *A47L 15/4229* (2013.01); *C02F 1/42* (2013.01); *C02F 5/00* (2013.01); *A47L 2401/09* (2013.01); *A47L 2501/18* (2013.01); *A47L 2501/26* (2013.01); *C02F 2201/005* (2013.01);
(Continued)

(58) Field of Classification Search
CPC ................................................. C02F 2209/42
See application file for complete search history.

(56) References Cited

U.S. PATENT DOCUMENTS

2005/0236019 A1* 10/2005 Bang .................. A47L 15/0023
134/56 D

FOREIGN PATENT DOCUMENTS

| DE | 28 51 118 | 6/1980 |
|---|---|---|
| EP | 0 461 722 | 12/1991 |
| EP | 0 591 678 | 4/1994 |

(Continued)

OTHER PUBLICATIONS

Extended European Search Report dated Feb. 3, 2015 from European Patent Application No. 14180434.4, 6 pages.
(Continued)

*Primary Examiner* — Jason Ko
(74) *Attorney, Agent, or Firm* — Staas & Halsey LLP

(57) ABSTRACT

A water softening apparatus having an improved structure to provide a function of an air brake, a dishwasher including the same and a control method thereof, the water softening apparatus having an air brake assembly and a regeneration tank and configured to soften wash water being supplied from a tub, wherein the air brake assembly including a water supply valve allowing wash water to be introduced therethrough, an ion exchange tank to accommodate an ion exchange resin therein, and a plurality of valves installed on a first path allowing wash water being introduced through the water supply valve to flow toward the ion exchange tank, wherein the regeneration tank is connected to the air brake assembly and accommodates regeneration material configured to purify the ion exchange resin.

28 Claims, 14 Drawing Sheets

(52) U.S. Cl.
CPC ...... *C02F 2209/42* (2013.01); *C02F 2303/22* (2013.01); *C02F 2307/12* (2013.01)

(56) References Cited

FOREIGN PATENT DOCUMENTS

| | | |
|---|---|---|
| EP | 1 023 868 | 8/2000 |
| EP | 1 334 688 | 8/2003 |
| EP | 1 457 153 | 9/2004 |
| KR | 10-2006-0095838 | 9/2006 |

OTHER PUBLICATIONS

European Office Action dated Jun. 13, 2017 from European Patent Application No. 14180434.4, 43 pages.

\* cited by examiner

WATER SOFTENING APPARATUS, DISHWASHER HAVING THE SAME AND CONTROL METHOD THEREOF

CROSS-REFERENCE TO RELATED APPLICATIONS

This application claims the benefit of Korean Patent Application No. 10-2013-0108593, filed on Sep. 10, 2013, in the Korean Intellectual Property Office, the disclosure of which is incorporated herein by reference.

BACKGROUND

1. Field

Embodiments of the present disclosure relate to a water softening apparatus, a dishwasher having the same and a control method thereof, and more particularly, to a water softening apparatus having an improved structure capable of enhancing the water softening efficiency, a dishwasher having the same and a control method thereof.

2. Description of the Related Art

A dishwasher represents an apparatus to clean dishware by spraying high pressure wash water toward the dishware, and in general, the dishwasher performs a preliminary washing stage, a main washing stage, a rinsing stage and a drying stage. In the preliminary washing stage, dirt of dishware is removed by spraying wash water without detergent, and in the main washing stage, a washing of the dishware is achieved by allowing detergent to be introduced by a detergent supply apparatus while spraying wash water.

The dishwasher includes a body provided at an inner side thereof with a washing tub, a basket reciprocatingly installed at an inside the washing tub and containing dishware, and a spray nozzle provided at an upper side and a lower side of the basket to spray wash water, so that the dishware is washed by the wash water sprayed by the spray nozzle.

Meanwhile, the dishwasher may adopt a water softening apparatus using an ion exchange resin to soften hard water. Hard water having a great amount of metal cations, such as calcium and magnesium, interfere with the action of soap or detergent, degrading the washing performance of the dishwasher.

The water softening apparatus is an apparatus for softening hard water by removing metal ions contained in the hard water, and includes an ion exchange resin tank to convert wash water into soft water and a regeneration tank to regenerate the ion exchange resin.

In addition, an air brake include a water supply port allowing a source water to be introduced therethrough, an ion exchange resin tank connection port connecting such that wash water introduced through the water supply port is introduced into the ion exchange resin tank and a regeneration tank connection port connecting such that wash water is introduced into the regeneration tank.

Although each of the water softening apparatus and the air brake may perform a different function, there is an increasing demand of a water softening apparatus having the function of an air brake as well as a dishwasher including such a water softening apparatus in terms of the convenience of consumer and optimization of system configuration.

An air brake assembly of a dishwasher is disclosed in Korean Patent Application Publication No. 10-2006-0095838 as a relevant prior art.

SUMMARY

Therefore, it is an aspect to provide a water softening apparatus having an improved structure to provide an air brake function, a dishwater including the same and a control method thereof.

It is an aspect to provide a water softening apparatus having an improved structure by which an air brake function is provided, the configuration of the water softening apparatus is simplified configuration, and a simple algorithm of use is provided, a dishwasher including the same, and a control method thereof.

Additional aspects will be set forth in part in the description which follows and, in part, will be obvious from the description, or may be learned by practice of the disclosure.

In accordance with an aspect, a water softening apparatus having an air brake assembly and a regeneration tank and configured to soften wash water being supplied from a tub, wherein the air brake assembly includes a water supply valve, an ion exchange tank and a plurality of valves. The water supply valve may allow wash water to be introduced therethrough. The ion exchange tank may accommodate an ion exchange resin therein. The plurality of valves may be installed on a first path allowing wash water being introduced through the water supply valve to flow toward the ion exchange tank. The regeneration tank may be connected to the air brake assembly and accommodate regeneration material configured to purify the ion exchange resin.

A plurality of through holes may be formed on the first path. The plurality of through holes may be on/off controlled by the plurality of valves.

The plurality of valves may be formed on the first path in a number and a position corresponding to a number and a position of the plurality of through holes.

The water softening apparatus may further include a supply water storage tank. The supply water storage tank may be provided at an upper side of the ion exchange tank and configured to store wash water being introduced through the water supply valve. The plurality of valves may include a first valve configured to control a flow of the wash water being introduced through the water supply valve toward the supply water storage tank, a second valve configured to control a flow of the wash water being introduced through the water supply valve toward the regeneration tank, and a third valve configured to control a flow of the wash water being introduced through the water supply valve toward the ion exchange tank.

When the wash water is supplied to the ion exchange tank, the first valve and the second valve may be switched off, and the third valve may be switched on.

When the wash water is supplied to the supply water storage tank, the first valve may be switched on, and the second valve and the third valve may be switched off. When the wash water stored in the supply water storage tank is discharged to the ion exchange tank, the first valve and the third valve may be switched on, and the second valve may be switched off.

When the wash water is supplied to the regeneration tank, the first valve and the third valve may be switched off, and the second valve may be switched on. When the wash water stored in the regeneration tank is discharged to the ion exchange tank, the first valve may be switched off, and the second valve and the third valve may be switched on.

The regeneration tank may include a path tube, at least one first flow path and at least one second flow path. The path tube may be connected to a protrusion formed on the second valve by a connecting member. The at least one first flow path may be formed along an edge of the regeneration tank so as to allow wash water being supplied to the path tube through the protrusion to flow thereathrough. The at least one second flow path may be formed along a bottom surface of the regeneration tank while diverged from the at least one first flow path so as to allow the wash water to flow therethrough.

Regeneration water stored in the regeneration tank may be discharged through the path tube and supplied to the ion exchange tank through the protrusion.

The regeneration tank may further include an opening/closing unit to open and close the regeneration tank to replenish the regeneration material, and an end portion of the at least one first flow path may be formed at a position equal to or higher than the opening/closing unit.

The end portion of the at least one first flow path may be bent toward the bottom surface of the regeneration tank.

One side surface of the second flow path facing the opening/closing unit may be provided with a partition wall unit and at least one bubble removing unit. The partition wall unit may have a slit shape such that wash water being introduced through the path tube flows toward the opening/closing unit. The at least one bubble removing unit may be provided lengthwise along the partition wall unit to remove bubbles contained in the wash water.

The partition wall unit and the at least one bubble removing unit may be coupled to each other such that the one side surface of the second flow path is provided in a flat shape.

The partition wall unit and the at least one bubble removing unit may be coupled to each other such that a step is formed on the one side surface of the second flow path.

The at least one bubble removing unit may be coupled to the partition wall unit to form a step having an inclination of about 22.5 degrees or below.

One of the at least one bubble removing unit may be coupled to the partition wall to form a step having an inclination of about 22.5 degrees or below toward one of the at least one first flow path. Another one of the at least one bubble removing unit may be coupled to the partition wall to form a step having an inclination of about 22.5 degrees or below toward another one of the at least one first flow path while facing the one of the at least one bubble removing unit.

The first path may be located along one side of the ion exchange tank to which the plurality of valves are coupled.

The air brake assembly may further include a second path allowing external air introduced through an inlet hole formed at one side of the air brake assembly to flow toward the tub after passing through a tub connecting hole. The tub connecting hole may be formed at one end portion of the second path.

The inlet hole may be provided at a position equal to or lower than a half of a height of the air brake assembly.

The second path may be connected to the tub connecting hole to prevent vapor discharged through the tub connecting hole during a washing operation from making contact with wash water stored in the supply water storage tank, the second path including at least one line forming a boundary with the supply water storage tank.

A plurality of guides may be formed on at least one side surface of the second path to prevent vapor discharged through the tub connecting hole from flowing backward during a washing operation.

The plurality of guides may include a plurality of first guides. The plurality of first guides may be formed on a portion of the second path corresponding to an upper surface of the supply water storage tank, and form a curved surface. The plurality of second guides may be formed on a portion of the second path corresponding to a lateral side surface of the supply water storage tank, and form a shape inclined toward the tub connecting hole.

A plurality of ribs may be formed at an inside of the supply water storage tank to guide wash waster stored in the supply water storage tank to be discharged to the ion exchange tank.

In accordance with an aspect, a dishwasher includes a tub, a door, a sump, an air brake assembly and a regeneration tank. The tub may be provided at an inside of a body of the dishwasher to wash dishes. The door may be installed at a front surface of the body so as to be open and close. The sump may be provided at a lower side of the tub to accommodate wash water. The air brake assembly may include an ion exchange tank accommodating an ion exchange resin therein and a plurality of valves installed at one side surface thereof, and a supply water storage tank located at an upper side of the ion exchange tank while integrally formed with the ion exchange tank. The regeneration tank may be connected to the ion exchange tank to regenerate the ion exchange resin and provided with a floating sensor unit installed therein to sense a water level of regeneration water accommodated therein and a density of regeneration material accommodated therein. The plurality of valves may be configured to be switched on/off and installed on a path allowing wash water being introduced through a water supply valve to flow toward the ion exchange tank therethrough.

The air brake assembly may be provided at an outer circumference of the tub, and the regeneration tank may be provided at an inner circumference of the door so as to be connected to the air brake assembly by a connecting member.

The regeneration tank may include an opening/closing unit to open and close the regeneration tank to replenish the regeneration material. A vent unit may be formed at an upper side of the opening/closing unit to allow air inside the tub to flow toward the generation tank.

A tube installed along an outer circumference of the tub may be connected to the vent unit. One end portion of the tube may be mounted at an inside lower end of the tub.

A blocking film may be installed on the vent unit to prevent foreign substance inside the tub from flowing to the regeneration tank.

The blocking film may protrude toward the tub while coupled to the bent unit.

The plurality of valves may include a first valve configured to control a flow of the wash water being introduced through the water supply valve toward the supply water storage tank, a second valve configured to control a flow of the wash water being introduced through the water supply valve toward the regeneration tank, and a third valve configured to control a flow of the wash water being introduced through the water supply valve toward the ion exchange tank. The plurality of valves may include a solenoid valve.

The dishwasher may further include a control unit configured to control on/off of the first valve, the second valve and the third valve such that the wash water is introduced to an inside of the regeneration tank or discharged to the ion exchange tank based on the water level of the regeneration water and the density of regeneration material that are sensed by the floating sensor unit.

The control unit may operate an alarming device informing a time for replenishing the regeneration material.

The floating sensor unit may include a floating sensor and a float whose floating position varies with the water level of the regeneration water and the density of the regeneration material. The floating sensor may generate a sensing signal depending on a distance from the float. The float may include a floating body whose floating position varies with the water level of the regeneration water and the density of the regeneration material, and a magnet coupled to the floating body.

An amount of the regeneration water required to regenerate the ion exchange resin may be about 140 ml or more and about 260 ml or less.

In accordance with an aspect, a method of controlling a dishwasher having a water softening apparatus, the method including: checking a position of a floating body whose floating position varies with a water level of regeneration water and a density of regeneration material by use of a floating sensor; comparing the checked position of the floating body with a reference position of the floating body; if determined that the position of the floating body reaches to the reference position of the floating body, switching off a first valve and switching on a second valve and a third valve such that regeneration water inside a regeneration tank is discharged to an ion exchange tank; if determined that the position of the floating body does not reach to the reference position of the floating body, switching off the first valve and the third valve and switching on the second valve such that a reference value of a water level of the regeneration water is satisfied by generating the regeneration water from wash water introduced into the regeneration tank; checking the position of the floating body after a predetermined period of time; and determining whether a present point of time corresponds to a time for replenishing the regeneration material by comparing the checked position of the floating body with the reference position of the floating body.

The reference position of the floating body may be a position satisfying the reference value of the water level of the regeneration water and a reference value of the density of the regeneration material.

The method may further include informing the time for replenishing the regeneration material by controlling an alarming device if the present point of time corresponds to the time for replenishing regeneration material.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
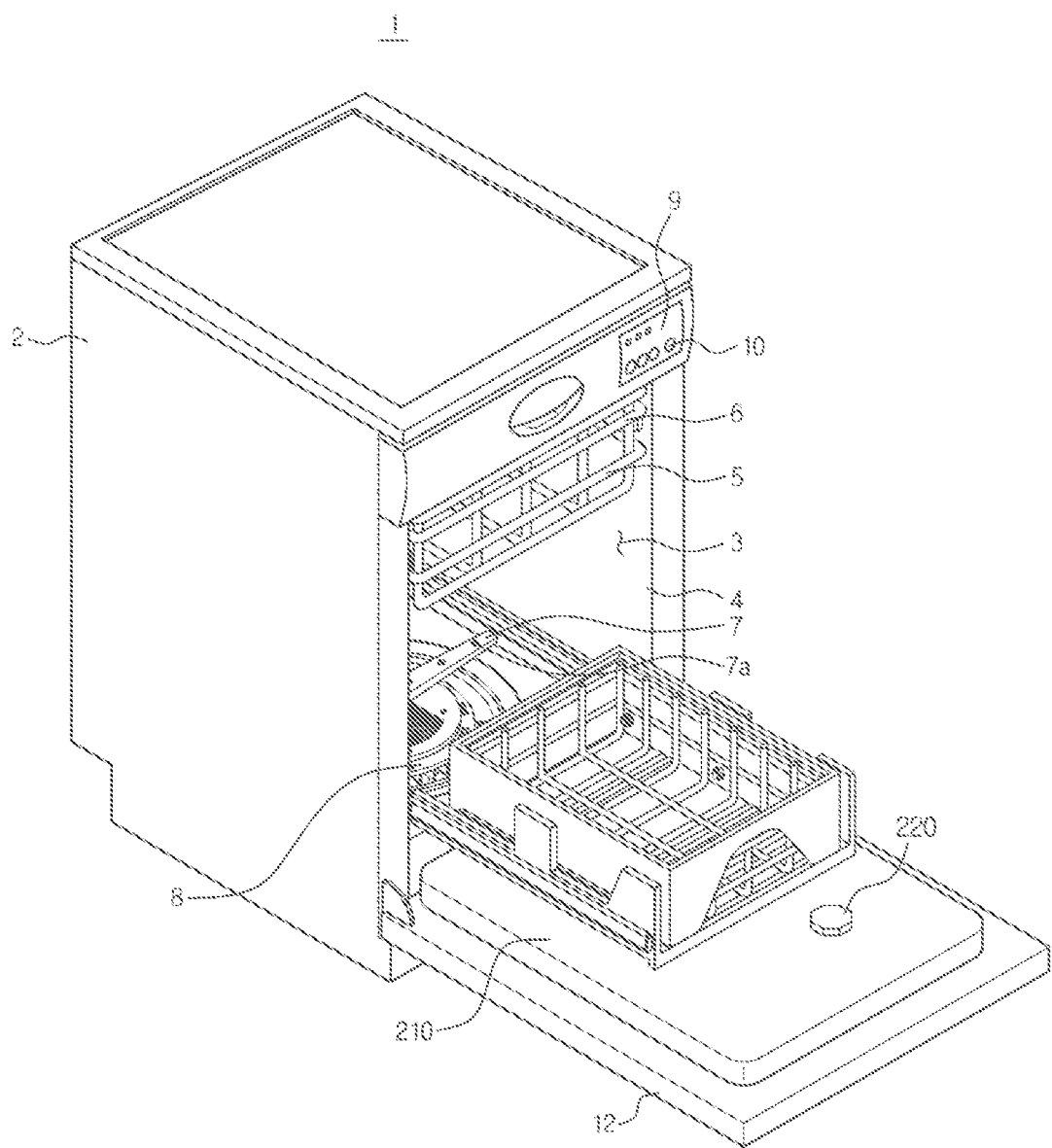
FIG. 1 is a perspective view illustrating a dishwasher in accordance with an embodiment.

Reference will now be made in detail to the embodiments, examples of which are illustrated in the accompanying drawings, wherein like reference numerals refer to like elements throughout.

Figure 2:
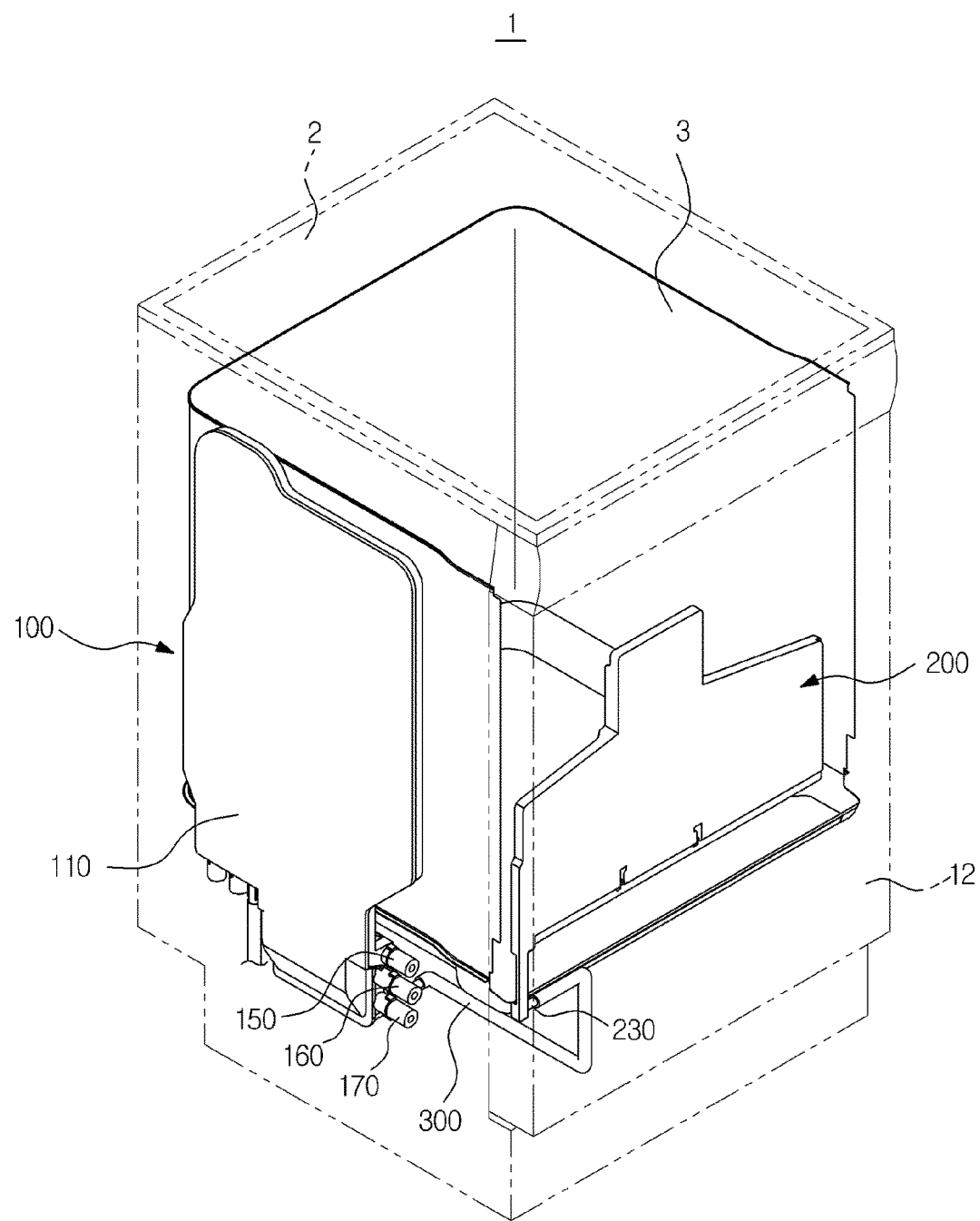
FIG. 2 is a perspective view illustrating a coupling structure of an air brake assembly and a regeneration tank of the dishwasher in accordance with an embodiment.
Figure 3:
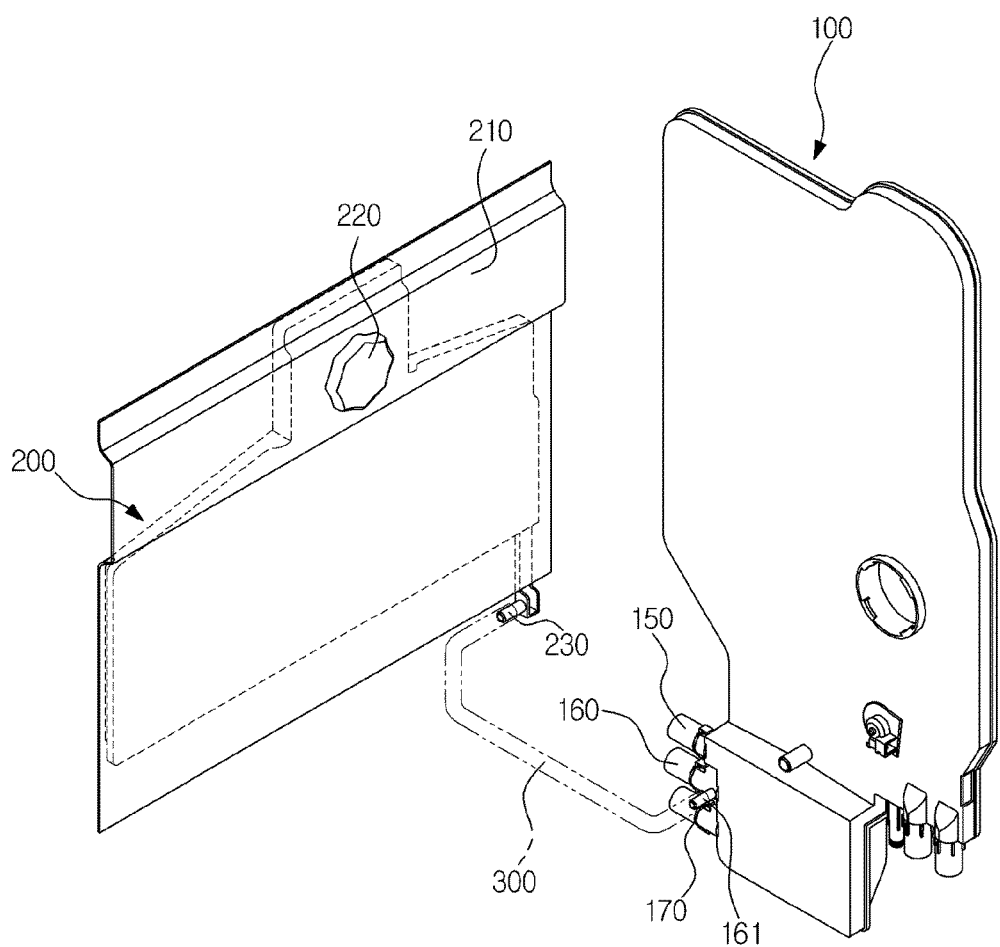
FIG. 3 is a perspective view illustrating a coupling structure of the air brake assembly and the regeneration tank of the dishwasher in accordance with an embodiment with some components of the dishwasher omitted.
Figure 4:
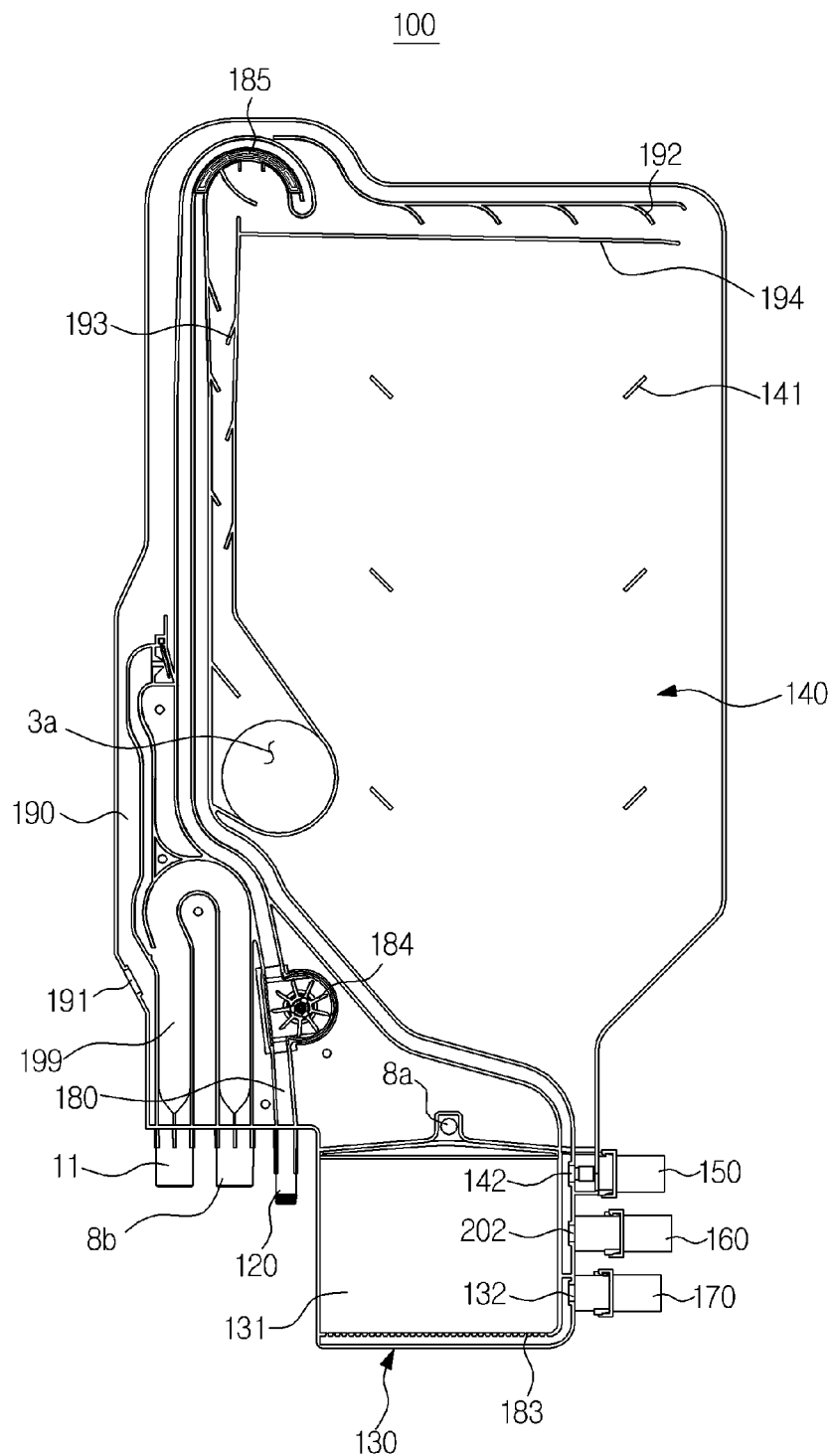
FIG. 4 is a drawing illustrating the air brake assembly of the dishwasher in accordance with an embodiment.
Figure 5:
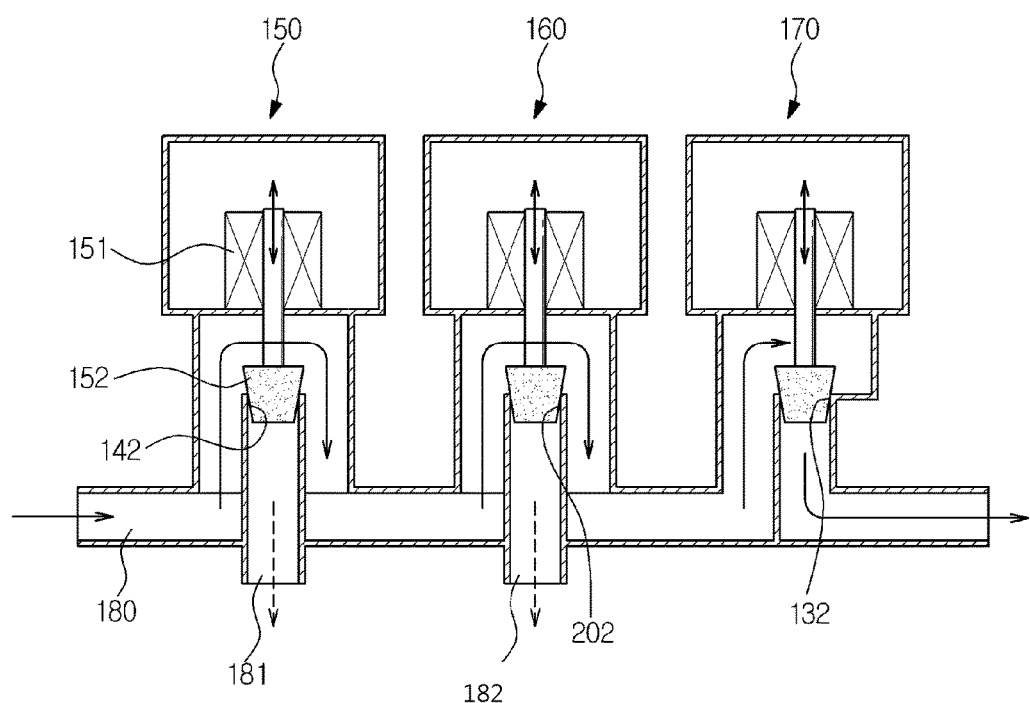
FIG. 5 is a schematic view illustrating an operating state of a plurality of valves of the dishwasher in accordance with an embodiment.

FIG. 1 is a perspective view illustrating a dishwasher in accordance with an embodiment, FIG. 2 is a perspective view illustrating a coupling structure of an air brake assembly and a regeneration tank of the dishwasher in accordance with an embodiment, FIG. 3 is a perspective view illustrating a coupling structure of the air brake assembly and the regeneration tank of the dishwasher in accordance with an embodiment with some components of the dishwasher omitted, FIG. 4 is a drawing illustrating the air brake assembly of the dishwasher in accordance with an embodiment, and FIG. 5 is a schematic view illustrating an operating state of a plurality of valves of the dishwasher in accordance with an embodiment.

Referring to FIGS. 1 to 5, a dishwasher 1 includes a body 2 provided with a tub 3 that forms an external appearance of the dishwasher 1 and in which dishware is washed. The body 2 is provided at a front surface thereof with an opening 4 formed to be open toward a front side such that dishware is inserted or withdrawn into/from the tub 3. The body 2 is provided at the front surface thereof with a door 12 installed while hinged to a front lower portion of the body 2 to open and close the opening 4 while rotating.

The body 2 is provided at the front surface thereof with a display unit 9 mounted to display an operating status of the dishwasher 1 and with a control unit 10 mounted to manipulate an operation of the dishwater 1.

One pair of baskets 5 provided with an accommodation unit having an upper surface thereof open to accommodate dishware are reciprocatingly installed at an upper side and a lower side of the tub 3 such that dishware is withdrawn and inserted through the front surface of the body 2 that is open.

In addition, a plurality of spray nozzles 7 are rotatably installed at an upper side and a lower side of each of the two baskets 5 to wash the dishware contained in the baskets 5 while rotating to spray water through spray holes 7a. In this case, the basket 5 is formed by a wire 6 disposed in a lattice pattern such that water sprayed from the spray nozzle 7 reaches to the dishware accommodated inside the basket 5.

The tub 3 is provided at a lower portion thereof with a sump 8 formed to accommodate wash water, and with a water supply device including a water supply path (not shown) to flow wash water and a water supply valve (not shown) and a water drain device including a drain path (not shown) and a drain pump (not shown).

The dishwasher 1 may include an air brake assembly 100 and regeneration tanks (200: 200a, 200b). The air brake assembly 100 may be installed at an outer circumferential surface of the tub 3, and the regeneration tank 200 may be installed at an inner circumferential surface of the door 12. The air brake assembly 100 is connected to the regeneration tank 200 through a connecting member 300. The connecting member 300 includes a rubber hose. The air brake assembly 100 has a cover 110 facing an inner circumferential surface of the body 2, and the regeneration tank 200 has a cover 210 facing an inside of the tub 3. The cover 210 of the regeneration tank 200 is provided with an opening/closing unit 220 to open and close the regeneration tank 200.

The air brake assembly 110 includes a water supply valve 120, an ion exchange tank 130, a supply water storage tank 140 and a plurality of valves 150, 160 and 170.

An ion exchange resin is accommodated in the ion exchange tank 130 to remove heavy metal and metal ions contained in wash water being introduced through the water supply valve 120 by adsorption. The ion exchange resin serves to change wash water into soft water having a superior washing performance. A representative example of ion exchange resin may be implemented using R—SO$_3$Na. Hard water is softened by use of an ion exchange resin through an equation below.

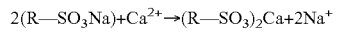

$$2(R-SO_3Na) + Ca^{2+} \rightarrow (R-SO_3)_2Ca + 2Na^+$$

The ion exchange tank 130 is provided at an inside of the air brake assembly 100 so as to be located at a lower side of the supply water storage tank 140. The plurality of valves 150, 160 and 170 may be installed at one side surface of the ion exchange tank 130. This will be described later in detail.

The supply water storage tank 140 is provided at an inside of the air brake assembly 100 so as to be located at an upper side of the ion exchange tank 130. Wash water being introduced through the water supply valve 120 is stored in the supply water storage tank 140 for a predetermined period of time, and thus the temperature of wash water (about 15° C.) becomes similar to the room temperature (about 23° C.). Accordingly, an additional energy consumption required to increase the temperature of wash water is reduced.

A plurality of ribs 141 may be formed at an inside of the supply water storage tank 140. The plurality of ribs 141 serve to guide wash water stored in the supply water storage tank 140 to be discharged toward the ion exchange tank 130 located at a lower side of the supply water storage tank 140. One end portion of each of the plurality of ribs 141 may be provided in a form inclined toward the ion exchange tank 130.

The plurality of valves 150, 160 and 170 may be formed on a first path 180 allowing wash water introduced through the water supply valve 120 to flow toward the ion exchange tank 130 therethrough. The plurality of valves 150, 160 and 170 control an on/off of through holes 132, 142 and 202 formed through the first path 180. The plurality of valves 150, 160 and 170 may be installed on the first path 180 in the number and position corresponding to the plurality of through holes 132, 142 and 202. The first path 180 may be formed along one side surface of the ion exchange tank 130 to which the plurality of valves 150, 160 and 170 are coupled.

Wash water introduced through the water supply valve 120 may be moved to one of the supply water storage tank 140, the ion exchange tank 130 and the regeneration tank 200 through the plurality of through holes 132, 142 and 202. In detail, the plurality of valves 150, 160 and 170 may include a first valve 140, a second valve 160 and a third valve 170. The first valve 150 controls wash water introduced through the water supply valve 120 toward the supply water storage tank 140 through the through hole 142, the second valve 160 controls wash water introduced through the water supply valve 120 toward the regeneration tank 200 through the through hole 202, and the third valve 170 controls wash water introduced through the water supply valve 120 toward the icon exchange tank 130 through the through hole 132.

The plurality of valves 150, 160 and 170 may include a solenoid valve. The plurality of valve 150, 160 and 170 may include a bobbin (referred to as a hollow cylinder around which a coil wire for an electric circuit is wound) and a plunger 152. When an electricity flows through the bobbin 151, the plunger 152 ascends so that paths 180, 181 and 182 communicating with the plurality of through holes 132, 142, and 202 are open, and when an electricity is blocked from the bobbin 151, the plunger 152 descends due to the weight of the plunger 152, so that the paths 180, 181 and 182 communicating with the plurality of through holes 132, 142, and 202 are closed.

The through hole 132 toward the ion exchange tank 130 is formed on the first path 180, and the through hole 142 toward the supply water storage tank 140 and the through hole 202 toward the regeneration tank 200 are formed on the paths 181 and 182 diverging from the first path 180.

An on-state of the plurality of valves 150, 160 and 170 represents a state in which the plunger 152 ascends, and an off-state of the plurality of valves 150, 160 and 170 represents a state in which the plunger 152 descends.

When wash water introduced through the water supply valve 120 is supplied to the ion exchange tank 130, the first valve 150 and the second valve 160 are in an off-state, and the third valve 170 is in an on-state. In this case, wash water introduced through the water supply valve 120 moves along the first path 180, and via the through hole 132, is supplied to the ion exchange tank 130. A slit 183 is formed at one end portion of the first path 180, and wash water flowing along the first path 180 is supplied to an ion exchange chamber 131 through the slit 183. The wash water supplied to the inside of the ion exchange tank 130 is supplied to the sump 8 through a sump inlet hole 8a.

When wash water introduced through the water supply valve 120 is supplied to the supply water storage tank 140, the first valve 150 is in an on state and the second valve 160 and the third valve 170 are in an off-state. In this case, wash water introduced through the water supply valve 120 moves to the supply water storage tank 140 along the path 181 via the through hole 132.

When wash water stored in the water supply storage tank 140 is discharged to the ion exchange tank 130, the first valve 150 and the third valve 170 are in an on-state, and the second valve 160 is in an off-state. In this case, wash water stored in the supply water storage tank 140 is discharged to the ion exchange tank 130 along the path 181 and the first path 180.

When wash water introduced through the water supply valve 120 is supplied to the regeneration tank 200, the first valve 150 and the third valve 170 are in an off-state, and the second valve 160 is in an on state. In this case, the wash water introduced through the water supply valve 120 is supplied to the regeneration tank 200 along the path 182 via the through hole 202.

When wash water stored in the regeneration tank 200 is discharged to the ion exchange tank 130, the first valve 150 is in an off state, and the second valve 160 and the third valve 170 are in an on-state. In this case, wash water stored in the regeneration tank 200 is discharged to the ion exchange tank 130 along the path 182 and the first path 180.

The number of the plurality of valves 150, 160 and 170 is not limited to three, and the position of the plurality of valves 150, 160 and 170 is not limited to one side surface of the ion exchange tank 130.

A flow meter 184 may be formed on the first path 180 to sense a water level of wash water introduced through the supply water valve 120.

The air brake assembly 100 is provided with a second path 190 allowing external air to flow therethrough. The second path 190 may include an inlet hole 191 and a tub connecting hole 3a. In detail, external air introduced through the inlet hole 191 formed at one side surface of the air brake assembly 100 moves along the second path 190, and through the tub connecting hole 3a formed at one end portion of the second path 190, is supplied to the tub 3. The tub connecting hole 3a communicates with the inside of the tub 3.

The inlet hole 191 allowing external air to be introduced therethough is formed at a position equal to or lower than a half of the height of the air brake assembly 100. The nearer to a bottom surface of the air brake assembly 100 the inlet hole 191 is formed, the longer the length of the second path 190 is.

A plurality of guides 192 and 193 may be formed on the second path 190. The plurality of guides 192 and 193 may be installed on at least one side surface of the second path 190 to prevent vapor discharged through the tub connecting hole 3a from the tub 3 during a washing operation from flowing backward. The plurality of guides 192 and 193 may include a plurality of first guides 192 and a plurality of second guides 193. The plurality of first guides 192 are formed on a portion of the second path 190 corresponding to an upper surface of the supply water storage tank 140, and the plurality of second guides 193 are formed on a portion of the second path 190 corresponding to a lateral side surface of the supply water storage tank 140. The plurality of first guides 192 may have a curved surface, and the plurality of second guides 193 may have a shape inclined toward the tub connecting hole 3a. The plurality of first guides 192 are formed at one side surface of the second path 190, and the plurality of second guides 193 are formed at both side surfaces of the second path 190 so as to face each other. The shape and position of the plurality of first guides 192 and the plurality of second guides 193 are not limited thereto, and may vary as long as the plurality of guides 192 and 193 prevent vapor discharged through the tub connecting hole 3a from flowing backward.

The second path 190 may include at least one line 194 to prevent vapor discharged through the tub connecting hole 3a from making contact with wash water stored in the supply water storage tank 140. The at least one line 194 is connected to the tub connecting hole 3a so as to form a boundary with respect to the supply water storage tank 140. The at least one line 194 may be located at an upper surface of the supply water storage tank 140, but the position of the at least one line 194 is not limited thereto. The at least one line 194 may form one surface of the second path 190 forming the boundary with respect to the supply water storage tank 140. The more the at least one line 194 is, the more difficult vapor discharged through the tub connecting hole 3a makes contact with the wash water stored in the supply water storage tank 140.

An air gap 185 is formed at one side of the first path 180 to prevent a siphone phenomenon from occurring when water supply is stopped.

The air brake assembly 100 may further include a sump drain connecting port 8b connecting to the sump 8 to discharge wash water to the outside after the washing operation is finished, a drain hose connecting port 11 connecting to a drain hose (not shown) and a drain path 199 serving as a path of wash water being drained.

Figure 6:
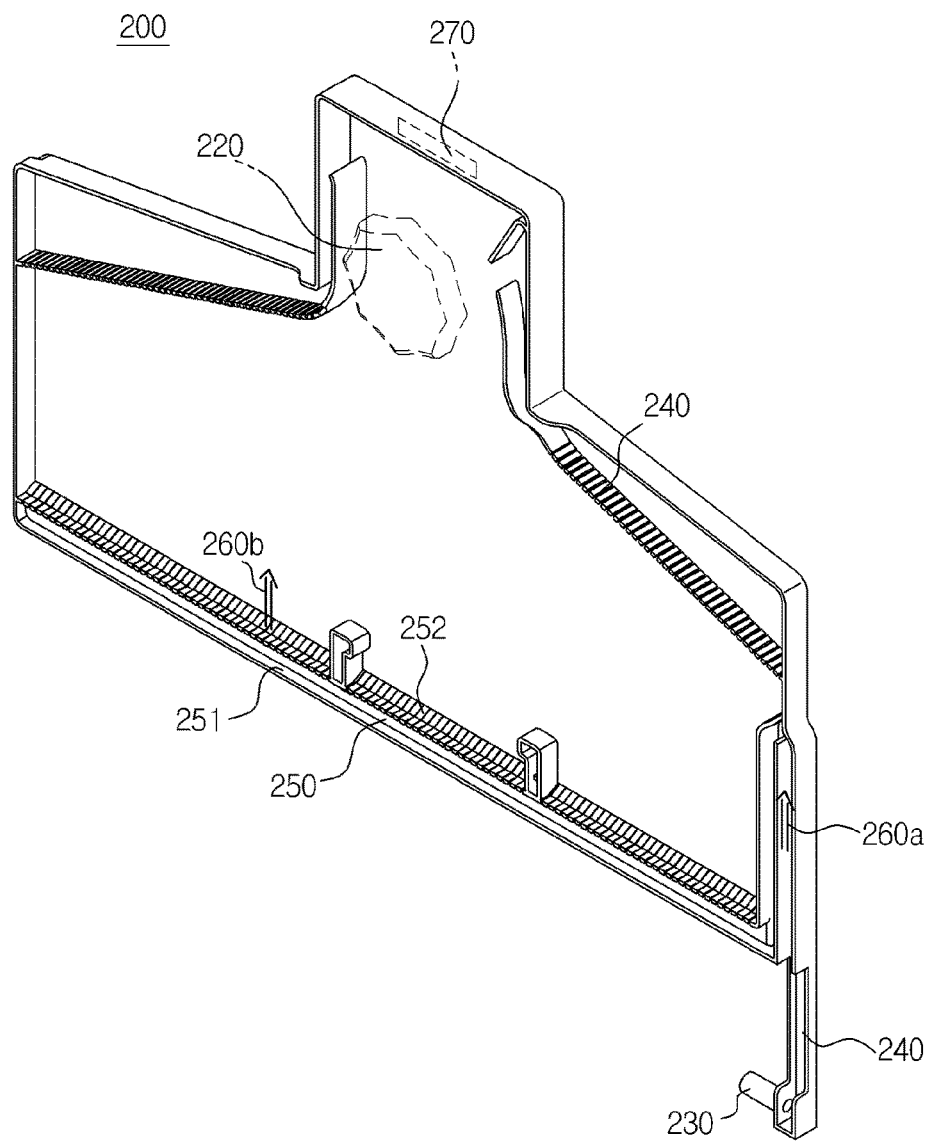
FIG. 6 is a drawing illustrating the regeneration tank of the dishwasher in accordance with an embodiment.
Figure 7:
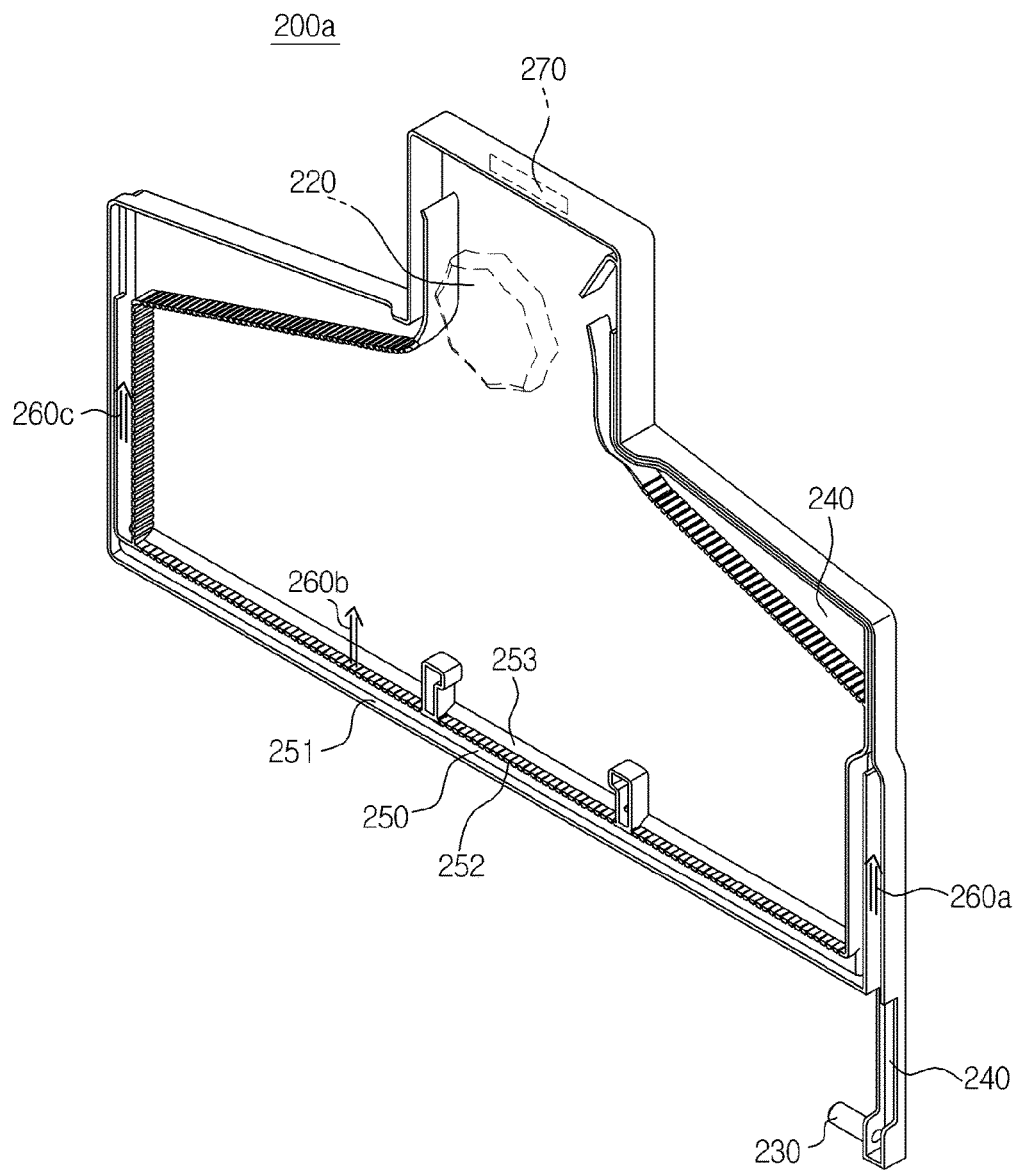
FIG. 7 is a drawing illustrating a regeneration tank of a dishwasher in accordance with an embodiment.
Figure 8A:
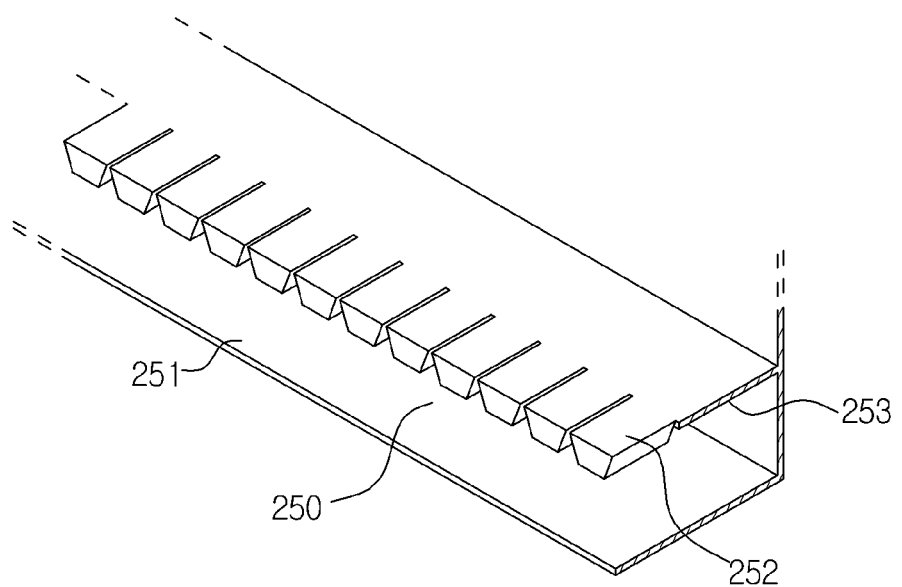
FIGS. 8A to 8D are drawing a coupling structure of a partition wall unit and a bubble removing unit that are installed on the regeneration tank of FIG. 7.
Figure 8B:
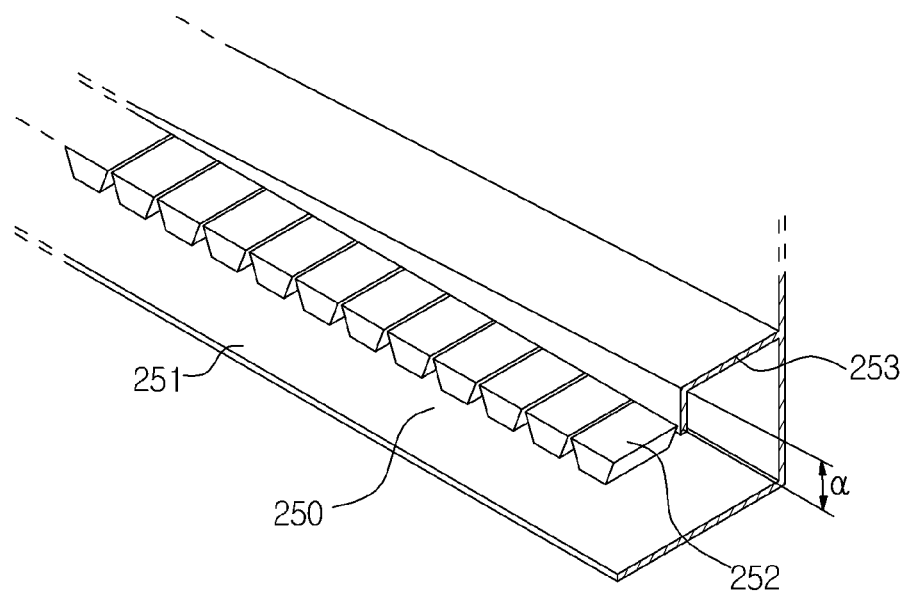
Figure 8C:
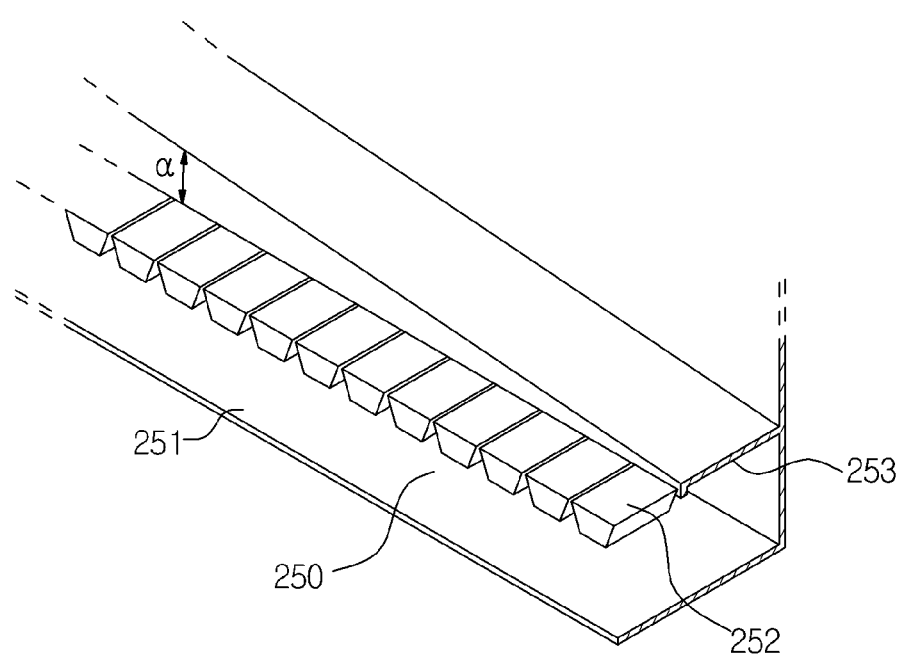
Figure 8D:
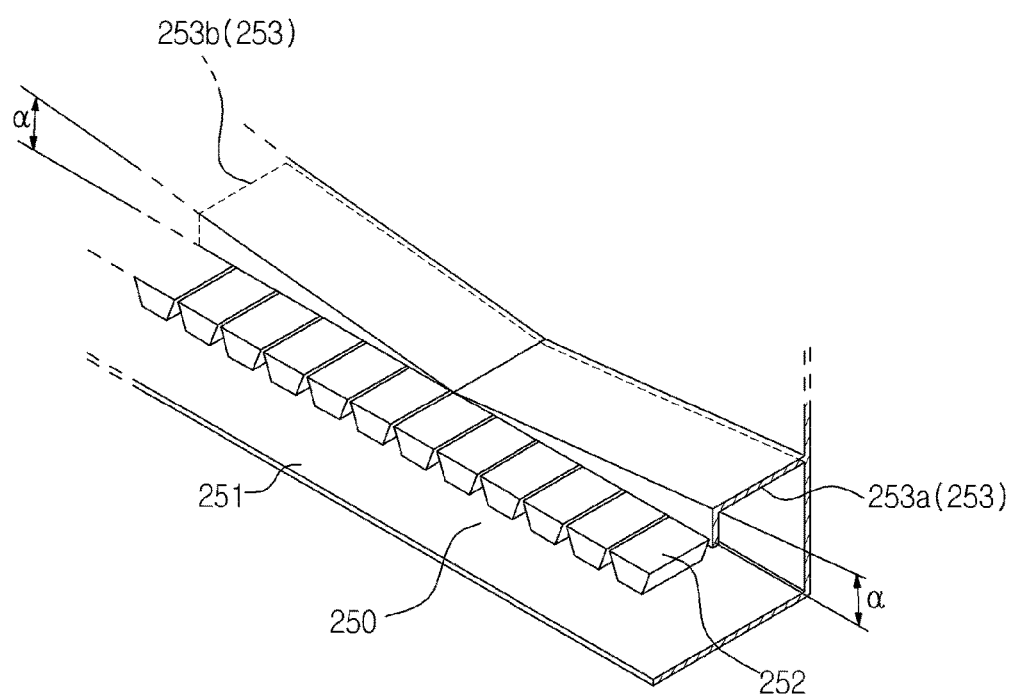

FIG. 6 is a drawing illustrating the regeneration tank of the dishwasher in accordance with an embodiment, and FIG. 7 is a drawing illustrating a regeneration tank of a dishwasher in accordance with an embodiment.

Referring FIGS. 6 and 7, regeneration material is accommodated in the regeneration tank 200 to improve the water softening performance by regenerating the ion exchange resin. The regeneration material in the regeneration tank 200 may be implemented as salt NaCl. The ion exchange resin, after adsorbing metal ions contained in wash water, increases in the volume thereof, and thus the performance to adsorb metal ions is lowered. A process of the ion exchange resin removing metal ions is referred to as a regeneration by an ion exchange resin. The regeneration reaction of the ion exchange resin is achieved by an equation below, so that ions of the ion exchange resin being exhausted as the water softening reaction continues are restored.

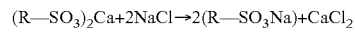

$$(R\text{---}SO_3)_2Ca + 2NaCl \rightarrow 2(R\text{---}SO_3Na) + CaCl_2$$

The amount of regeneration water required to regenerate the ion exchange resin is about 140 ml or more and about 260 ml or less.

The regeneration tank 200 may include a path tube 230, at least one first flow path 240 and at least one second flow path 250.

The path tube 230 is connected to a protrusion 161 located at a rear surface of the second valve 160 through the connecting member 300. The protrusion 161 may be formed at an end portion of the path 182. Regeneration water stored in the regeneration tank 200 is discharged from the path tube 230, and after sequentially passing through the connecting member 300 and the protrusion 161, is supplied to the ion exchange tank 130 along the first path 180. On the contrary, wash water introduced through the supply water valve 120 is discharge from the protrusion 161, and after sequentially passing through the connecting member 300 and the path tube 230, is supplied to the regeneration tank 200. That is, the path tube 230 corresponds to a water outtake part of regeneration water as well as a water intake part of wash water.

The wash water introduced to the path tube 230 through the protrusion 161 moves along the at least one first flow path 240 formed along an edge of the regeneration tank 200. The at least one first flow path 240 extends toward an upper side of the regeneration tank 200, and an end portion of the at least one first flow path 240 extending toward an upper side of the regeneration tank 200 is bent toward a bottom surface 251 of the regeneration tank 200. In addition, the end portion of the at least one first flow path 240 extending toward an upper side of the regeneration tank 200 may be located at a position equal to or higher than that of the opening/closing unit 220 provided at an upper side of the cover 210.

The second flow path 250 diverges from the at least one first flow path 240 so as to be formed along the bottom surface 251 of the regeneration tank 200 such that wash water introduced through the path tube 230 flows through the second flow path 250. A partition wall unit 252 having a slit shape is formed at one side surface of the second flow path 250 facing the opening/closing unit 220. The other side surface of the second flow path 250 corresponds to the bottom surface 251 of the regeneration tank 200. The partition wall unit 252 having a slit shape allows regeneration material, for example, salt, accommodated in the regeneration tank 200 to have a uniform distribution.

When the at least one first flow path 240 is provided along an edge of one side of the regeneration tank 200, two paths 260a and 260b may be formed for distributing regeneration material solution in the regeneration tank 200. When the at least one first flow path 240 is provided along edges of both sides of the regeneration tank 200, three paths 260a, 260b and 260c may be formed for distributing regeneration material solution in the regeneration tank 200. If the at least one first flow path 240 is provided along edges of both sides of the regeneration tank 200, and three paths 260a, 260b and 260c are formed, the regeneration material solution is dispersed along the three paths 260a, 260b and 260c, which reduces impact exerted on the partition wall 252 having a slit shape by wash water or regeneration material solution being introduced through the path tube 230.

The opening/closing unit 220 is provided at an upper side thereof with a vent unit 270 to allow air in the tub 3 to flow toward the regeneration tank 200.

A tube (not shown) installed along the outer circumferential surface of the tub 3 is connected to the vent unit 270, and one end portion of the tube may be mounted at an inside lower end portion of the tub 3. As the tube is connected to the vent unit 270, air in the tub 3 moves toward the regeneration tank 200 along the tube.

A blocking film (not shown) may be installed on the vent unit 270. Since the blocking film is installed on the vent unit 270, residue of food is prevented from being introduced to the regeneration tank 200.

FIGS. 8A to 8D are drawing a coupling structure of a partition wall unit and a bubble removing unit that are installed on the regeneration tank of FIG. 7.

Referring to FIGS. 8A to 8D, the partition wall unit 252 and at least one bubble removing unit 253 may be formed at a portion of one side surface of the second flow path 250 facing the opening/closing unit 220. Bubbles may be included in wash water introduced through the path tube 230. The bubbles may block the partition wall unit 252 having a slit shape and prevent wash water from moving to an upper side of the regeneration tank 200. In order to remove the bubbles, the at least one bubble removing unit 253 may be formed in a longitudinal direction of the partition unit 252.

The partition wall 252 and the at least one bubble removing unit 253 may correspond to the one side surface of the second flow path 250 facing the opening/closing unit 220.

The at least one bubble removing unit 253 may be coupled to a side surface of the partition wall unit 252 in a longitudinal direction of the partition wall unit 252 such that the one side surface of the second flow path 250 facing the opening/closing unit 220 is provided in a flat shape.

In addition, the at least one bubble removing unit 253 may be coupled to a side surface of the partition wall unit 252 in a longitudinal direction of the partition wall unit 252 such that a step is formed on the one side surface of the second flow path 250 facing the opening/closing unit 220.

The step formed when the at least one bubble removing unit 253 is coupled to the partition wall unit 252 may have an inclination of about 22.5 degrees or below.

When the at least one bubble removing unit 253 is provided in two units thereof, one bubble removing unit 253a of the at least one bubble removing units 253 is coupled to the side surface of the partition wall unit 252 to form a step having an inclination of about 22.5 degrees or below toward one of the at least one first flow path 240, and another one bubble removing unit 253b of the at least one bubble removing unit 253 is coupled to the side surface of the partition wall 252 to form a step having an inclination of about 22.5 degrees or below toward another one of the at least one first flow path 240 while facing the one bubble removing unit 253a of the at least one bubble removing unit 253.

Bubbles included in the wash water may move to the upper side of the regeneration tank 200 through the at least one first flow path 240 formed at the edge of the regeneration tank 200 along an inner circumferential surface of the bubble removing unit 253.

Figure 9:
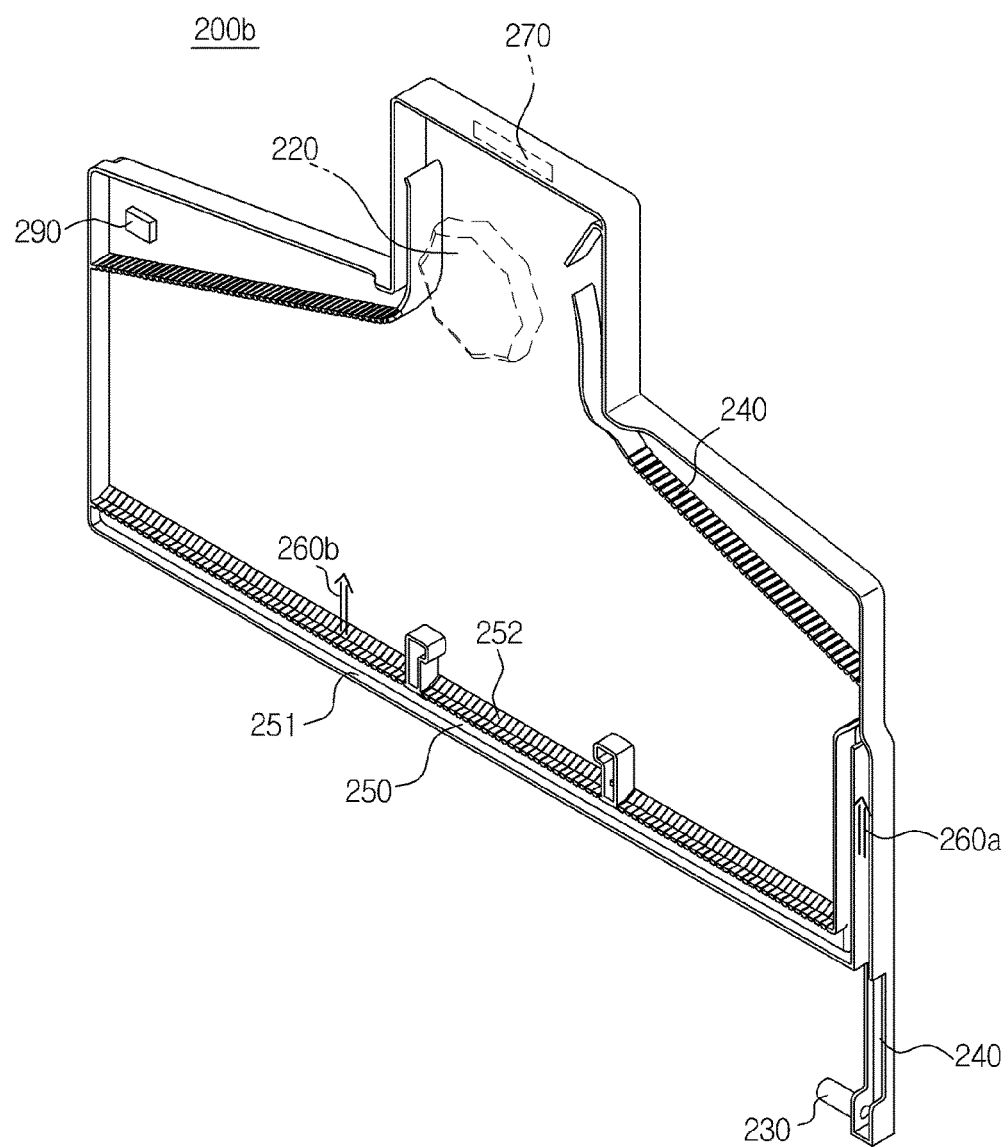
FIG. 9 is a drawing illustrating a regeneration tank of a dishwasher in accordance with an embodiment.
Figure 10:
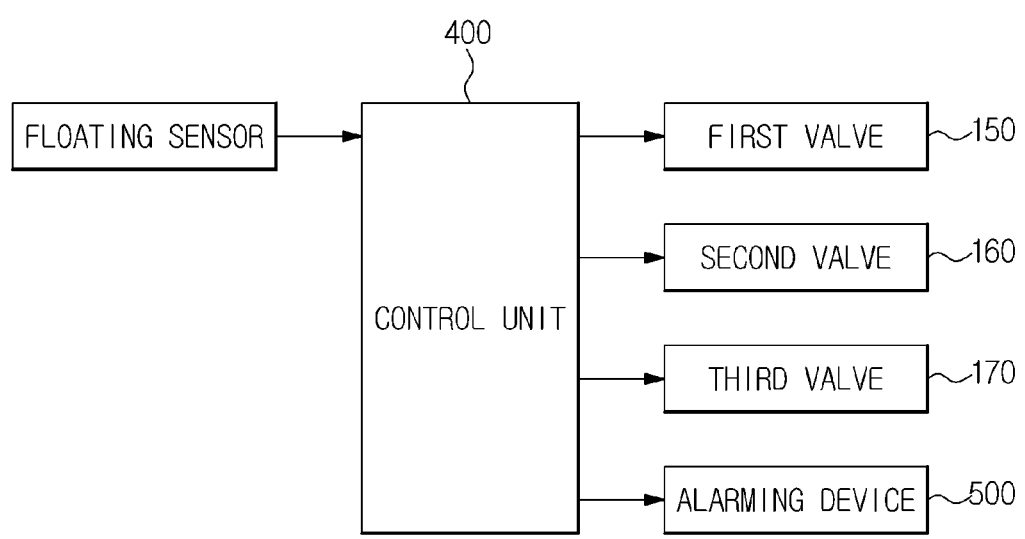
FIG. 10 is a block diagram showing a process of a dishwasher being controlled by a floating sensor unit installed on the regeneration tank of FIG. 9.

FIG. 9 is a drawing illustrating a regeneration tank of a dishwasher in accordance with an embodiment, and FIG. 10 is a block diagram showing a process of a dishwasher being controlled by a floating sensor unit installed on the regeneration tank of FIG. 9.

Referring to FIGS. 9 and 10, a water level sensor unit 290 may be installed on a regeneration tank 200b to sense a water level of regeneration water and a density of regeneration material.

The water level sensor unit 290 may include a floating sensor (not shown) and a float (not shown). The floating sensor generates a sensing signal depending on a distance from the float whose floating position varies with the water level of the regeneration water and the density of the regeneration material.

The float may include a floating body (not shown) whose floating position varies with the water level of regeneration water and the density of regeneration material, and a magnet coupled to the floating body.

The dishwasher 1 may further include a control unit 400 and an alarming device 500. The control unit 400 may switch on/off the first valve 150, the second valve 160 and the third valve 170 such that wash water is introduced into the regeneration tank 200 or regeneration water is discharged to the ion exchange tank 130 based on the water level of regeneration water and the density of regeneration material that are sensed by the floating sensor.

In addition, the control unit 400 may operate the alarming device 500 to inform the time for replenishing regeneration material.

Figure 11:
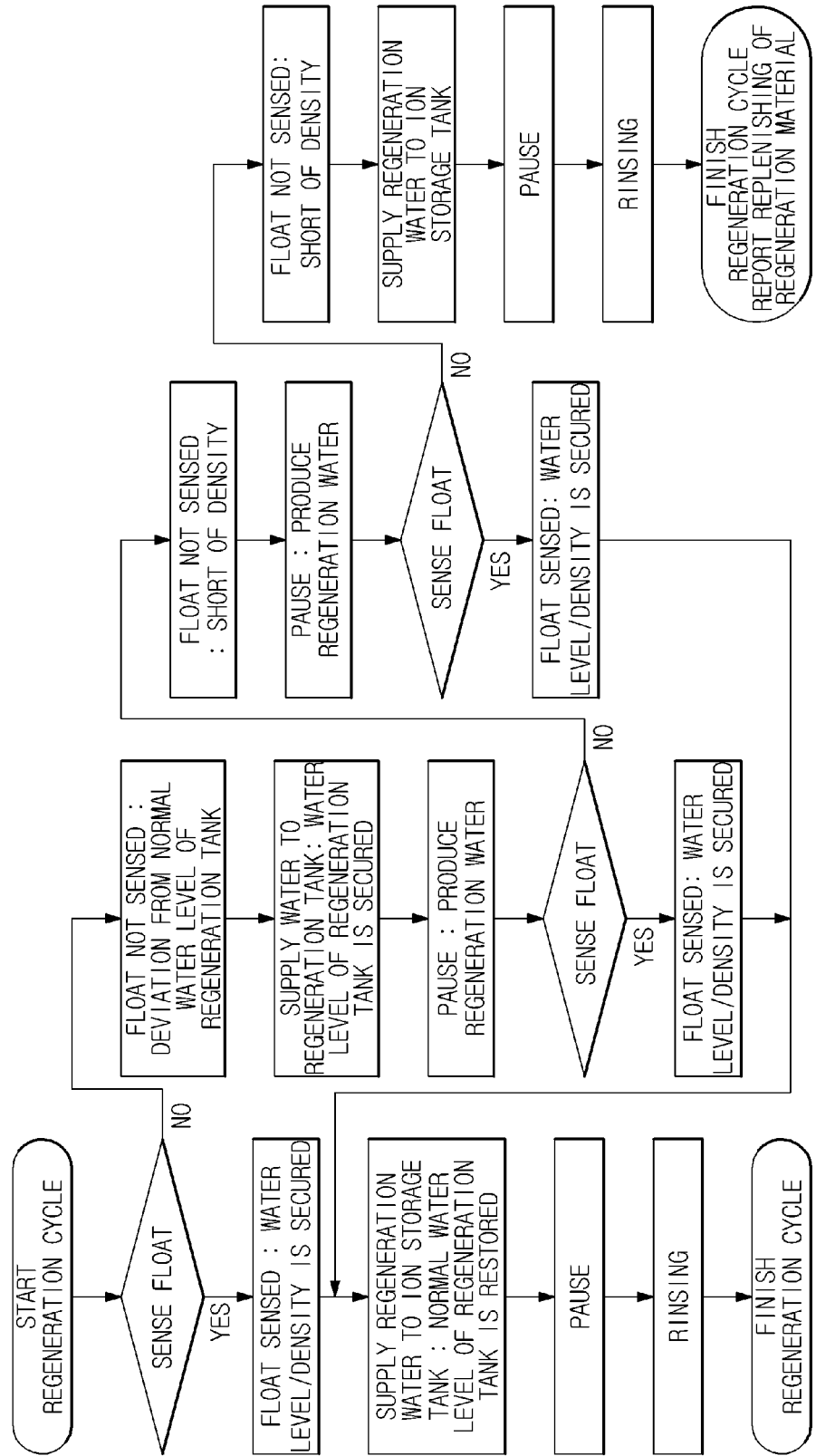
FIG. 11 is a flow chart showing an operating state of the floating sensor installed on the regeneration tank of FIG. 9.

FIG. 11 is a flow chart showing an operating state of the floating sensor installed on the regeneration tank of FIG. 9.

Referring to FIG. 11, a control method of a dishwasher including a water softening device is as follows.

The position of the floating body whose floating position varies with the water level of regeneration water and the density of regeneration material is checked, the checked position of the floating body is compared with a reference position of the floating body, and if determined that the checked position of the floating body reaches to the reference position of the floating body, the first valve is switched off and the second valve and the third valve are switched on such that regeneration water inside the regeneration tank is discharged to the ion exchange tank, and if determined that the checked position of the floating body does not reach to the reference position of the floating body, the first valve and the third valve are switched off and the second valve is switched on such that a reference value of a water level of the regeneration water is satisfied by generating the regeneration water from wash water introduced into the regeneration tank, and the position of the floating body is checked after a predetermined period of time. In this case, if determined that the checked position of the floating body reaches to the reference position of the floating body, the first valve is switched off and the second valve and the third valve are switched on such that regeneration water in the regeneration tank is discharged to the ion exchange tank, and if determined that the checked position of the floating body does not reach to the reference position of the floating body, the position of the floating body is checked using the floating sensor after a predetermined period of time to check whether the density of the regeneration material satisfies a reference value, the checked position of the floating body is compared with the reference position of the floating body to determine whether the current time corresponds to the time for replenishing regeneration material, and if determined that the floating body does not reach to the reference position of the floating body after the determination of the time for replenishing regeneration material, the first valve is switched off and the second valve and the third valve are switched on such that regeneration water in the regeneration tank is discharged to the ion exchange tank, and then the time for replenishing regeneration material is reported by controlling the alarming device.

The reference position of the floating body corresponds to a position satisfying the reference value of the water level of the regeneration water and the reference value of the density of the regeneration material.

As is apparent from the above description, the plurality of valves can control on/off of a plurality of through holes formed on a path along which wash water flows, so that the path is simplified and the material cost is reduced.

In addition, the water level sensor capable of controlling the water level of the regeneration water and the amount of regeneration material is mounted on the regeneration tank, so as to prevent increase of the material cost incurring from installing a plurality of sensors and minimize the waste of regeneration material, so that the water softening efficiency is enhanced.

Although a few embodiments have been shown and described, it would be appreciated by those skilled in the art that changes may be made in these embodiments without departing from the principles and spirit of the disclosure, the scope of which is defined in the claims and their equivalents.

What is claimed is:

1. A dishwasher, comprising:
   a body;
   a tub provided at an inside of the body configured to wash dishes;
   a door installed at a front side of the body and configured to open and close an opening in the front side of the body;
   an air brake assembly including:
      a water supply valve configured to allow wash water to be introduced therethrough;
      an ion exchange tank configured to accommodate an ion exchange resin therein and provided at an inside of the air brake assembly,
      a plurality of valves installed on a first path and configured to allow wash water being introduced through the water supply valve to flow toward the ion exchange tank; and
      a supply water storage tank provided at the inside of the air brake assembly so as to be located at an upper side of the ion exchange tank while integrally formed with the ion exchange tank and configured to store wash water being introduced through the water supply valve; and
   a regeneration tank connected to the air brake assembly and configured to accommodate regeneration material configured to purify the ion exchange resin,
   wherein the plurality of valves comprises:
   a first valve configured to control a flow of the wash water being introduced through the water supply valve toward the supply water storage tank;
   a second valve configured to control a flow of the wash water being introduced through the water supply valve toward the regeneration tank; and
   a third valve configured to control a flow of the wash water being introduced through the water supply valve toward the ion exchange tank,
   wherein
   the air brake assembly is installed at an outer circumferential surface of the tub, and includes a first cover facing an inner circumferential surface of the body,
   the regeneration tank is installed at an inner circumferential surface of the door, and includes a second cover that faces an inside of the tub when the door closes the opening, and a path tube connected to a protrusion located at the second valve by a connecting member.

2. The dishwasher of claim 1, wherein:
   a plurality of through holes are formed on the first path; and
   the plurality of through holes are on/off controlled by the plurality of valves.

3. The dishwasher of claim 2, wherein the plurality of valves are formed on the first path in a number and a position corresponding to a number and a position of the plurality of through holes.

4. The dishwasher of claim 1, wherein
   when the wash water is supplied to the ion exchange tank, the first valve and the second valve are switched off, and the third valve is switched on.

5. The dishwasher of claim 1, wherein:
   when the wash water is supplied to the supply water storage tank, the first valve is switched on, and the second valve and the third valve are switched off; and
   when the wash water stored in the supply water storage tank is discharged to the ion exchange tank, the first valve and the third valve are switched on, and the second valve is switched off.

6. The dishwasher of claim 1, wherein:
   when the wash water is supplied to the regeneration tank, the first valve and the third valve are switched off, and the second valve is switched on; and
   when the wash water stored in the regeneration tank is discharged to the ion exchange tank, the first valve is switched off, and the second valve and the third valve are switched on.

7. The dishwasher of claim 1, wherein the regeneration tank further includes:
   at least one first flow path formed along an edge of the regeneration tank so as to allow wash water being supplied to the path tube through the protrusion to flow therethrough; and
   at least one second flow path formed along a bottom surface of the regeneration tank while diverged from the at least one first flow path so as to allow the wash water to flow therethrough.

8. The dishwasher of claim 7, wherein regeneration water stored in the regeneration tank is discharged through the path tube and supplied to the ion exchange tank through the protrusion.

9. The dishwasher of claim 7, wherein:
   the regeneration tank further comprises an opening/closing unit to open and close the regeneration tank to replenish the regeneration material; and
   an end portion of the at least one first flow path is formed at a position equal to or higher than the opening/closing unit.

10. The dishwasher of claim 9, wherein the end portion of the at least one first flow path is bent toward the bottom surface of the regeneration tank.

11. The dishwasher of claim 9, wherein one side surface of the second flow path facing the opening/closing unit is provided with:
   a partition wall unit having a slit shape such that wash water being introduced through the path tube flows toward the opening/closing unit; and
   at least one bubble removing unit provided lengthwise along the partition wall unit to remove bubbles contained in the wash water.

12. The dishwasher of claim 11, wherein the partition wall unit and the at least one bubble removing unit are coupled to each other such that the one side surface of the second flow path is provided in a flat shape.

13. The dishwasher of claim 11, wherein the partition wall unit and the at least one bubble removing unit are coupled to each other such that a step is formed on the one side surface of the second flow path.

14. The dishwasher of claim 13, wherein the at least one bubble removing unit is coupled to the partition wall unit to form a step having an inclination of about 22.5 degrees or below.

15. The dishwasher of claim 13, wherein:
   one of the at least one bubble removing unit is coupled to the partition wall to form a step having an inclination of about 22.5 degrees or below toward one of the at least one first flow path; and
   another one of the at least one bubble removing unit is coupled to the partition wall to form a step having an inclination of about 22.5 degrees or below toward another one of the at least one first flow path while facing the one of the at least one bubble removing unit.

16. The dishwasher of claim 1, wherein the first path is located along one side of the ion exchange tank to which the plurality of valves are coupled.

17. The dishwasher of claim 1, wherein:
   the air brake assembly further comprises a second path allowing external air introduced through an inlet hole formed at one side of the air brake assembly to flow toward the tub after passing through a tub connecting hole; and
   the tub connecting hole is formed at one end portion of the second path.

18. The dishwasher of claim 17, wherein the inlet hole is provided at a position equal to or lower than a half of a height of the air brake assembly.

19. The dishwasher of claim 17, wherein the second path is connected to the tub connecting hole to prevent vapor discharged through the tub connecting hole during a washing operation from making contact with wash water stored in the supply water storage tank, the second path comprising at least one line forming a boundary with the supply water storage tank.

20. The dishwasher of claim 17, wherein a plurality of guides are formed on at least one side surface of the second path to prevent vapor discharged through the tub connecting hole from flowing backward during a washing operation.

21. The dishwasher of claim 20, wherein the plurality of guides comprise:
   a plurality of first guides formed on a portion of the second path corresponding to an upper surface of the supply water storage tank, and forming a curved surface; and
   a plurality of second guides formed on a portion of the second path corresponding to a lateral side surface of the supply water storage tank, and forming a shape inclined toward the tub connecting hole.

22. The dishwasher of claim 1, wherein a plurality of ribs are formed at an inside of the supply water storage tank to guide wash water stored in the supply water storage tank to be discharged to the ion exchange tank.

23. A home appliance, comprising:
   an air brake assembly including:
      a water supply valve configured to allow wash water to be introduced therethrough,
      an ion exchange tank configured to accommodate an ion exchange resin therein to soften wash water being supplied and provided at an inside of the air brake assembly,
      a plurality of valves installed on a first path and configured to allow wash water being introduced through the water supply valve to flow toward the ion exchange tank, and
      a supply water storage tank provided at the inside of the air brake assembly so as to be located at an upper side of the ion exchange tank and configured to store wash water being introduced through the water supply valve; and
   a regeneration tank configured to accommodate regeneration material configured to purify the ion exchange resin and connected to one of the plurality of valves to regenerate the ion exchange resin,
   wherein the plurality of valves installed on the first path comprises a first valve, a second valve, and a third valve,
   wherein:
   the first valve is configured to, in a first state, control a flow of the wash water being introduced through the water supply valve toward the supply water storage tank when the second valve and the third valve are in a second state, and control a discharge of wash water stored in the supply water storage tank toward the ion exchange tank when the second valve is in the second state and the third valve is in the first state;
   the second valve is configured to, in the first state, control a flow of the wash water being introduced through the water supply valve toward the regeneration tank when the first valve and the third valve are in the second state, and control a discharge of wash water stored in the regeneration tank toward the ion exchange tank when the first valve is in the second state and the third valve is in the first state; and
   the third valve is configured to, in the first state, control a flow of the wash water being introduced through the water supply valve toward the ion exchange tank when the first valve and the second valve are in the second state.

24. The home appliance of claim 23, wherein the first valve is installed on the first path upstream of the second valve and the third valve, and the second valve is installed on the first path upstream of the third valve.

25. The home appliance of claim 23, wherein the plurality of valves are configured such that when the wash water is introduced through the water supply valve toward the ion exchange tank, the wash water flows along the first path in a first direction toward the first valve, along the first path in the first direction toward the second valve after passing the first valve, and is discharged along the first path in the first direction toward the ion exchange tank after passing the third valve.

26. The home appliance of claim 23, wherein the wash water flows downward along a portion of the first path toward the plurality of valves, the portion of the first path being disposed directly above the plurality of valves such that the wash water is introduced into the plurality of valves along the portion of the first path at a point above a bottom surface of the ion exchange tank.

27. The home appliance of claim 23, wherein the plurality of valves are installed on a side surface of the ion exchange tank and above a bottom surface of the ion exchange tank.

28. The home appliance of claim 23, wherein
the second valve controls the flow of the wash water being introduced through the water supply valve toward the regeneration tank in a first direction, through a first through hole provided in the first path, and
the third valve controls the flow of the wash water being introduced through the water supply valve toward the ion exchange tank in a second direction substantially perpendicular to the first direction, through a second through hole provided in the first path.

\* \* \* \* \*